United States Patent [19]

Hennick

[11] Patent Number: 4,607,972
[45] Date of Patent: Aug. 26, 1986

[54] DETACHABLE JOINT FOR MODULAR FURNITURE

[76] Inventor: Donald C. Hennick, 9547 Wallingford North, Seattle, Wash. 98103

[21] Appl. No.: 591,208

[22] Filed: Mar. 19, 1984

[51] Int. Cl.⁴ .............................................. F16B 12/44
[52] U.S. Cl. ........................................ 403/8; 403/231; 403/255; 248/188
[58] Field of Search .................... 403/231, 403, 382, 8, 403/255, 252; 248/188

[56] References Cited

U.S. PATENT DOCUMENTS

| | | |
|---|---|---|
| 239,838 | 4/1881 | Pleukharp . |
| 326,582 | 9/1885 | Osborn et al. . |
| 430,111 | 6/1890 | Carl . |
| 473,151 | 4/1892 | Good et al. . |
| 533,766 | 2/1895 | Williams . |
| 946,423 | 1/1910 | Connaty . |
| 1,558,618 | 10/1925 | Jasper ................... 248/188 |
| 1,945,197 | 6/1932 | Koch et al. ............... 45/48 |
| 3,166,031 | 1/1965 | Lauber .................. 108/156 |
| 3,409,258 | 11/1968 | Carlson ................. 248/188 |
| 3,572,787 | 3/1971 | Timmerman .......... 287/189.36 |
| 3,901,612 | 8/1975 | Canin ..................... 403/8 X |
| 4,055,318 | 10/1977 | Duckett ................. 403/231 X |
| 4,432,590 | 2/1984 | Lawrence ............... 403/231 X |

Primary Examiner—Andrew V. Kundrat
Attorney, Agent, or Firm—Joan H. Pauly

[57] ABSTRACT

A vertical support member (2, 42) has one or more vertical slots (4, 44) each of which is dimensioned to receive the end of a side rail (6, 50). A portion of a lock member (12, 56) is also received into each slot (4, 44) contiguous to a side rail (6, 50). One end of a rod (18, 58) engages member (12, 56). Rod (18, 58) extends through a horizontal portion of the structure, and its second end is engaged by an adjustable fastener to pull member (2, 42) and the horizontal portion together. In a first embodiment, two perpendicular side rails (6) are received into slots (4), and a diagonal corner brace (8) extends between rails (6). Lock member (12) extends around member (2) between slots (4). A bolt (18) engages a center portion of member (12), extends through member (12) and brace (8), and is fastened by a nut (22). In a second embodiment, one rail (50) is received into a T-shaped slot (44). The lock member is a plate (56) received into the head portion (46) of slot (44). Rod (58) is attached to plate (56), extends through a hole in rail (50), and is fastened by a nut (62). Preferably, the second end of rod (58) and nut (62) are positioned inside a cavity (54) in rail (50).

18 Claims, 7 Drawing Figures

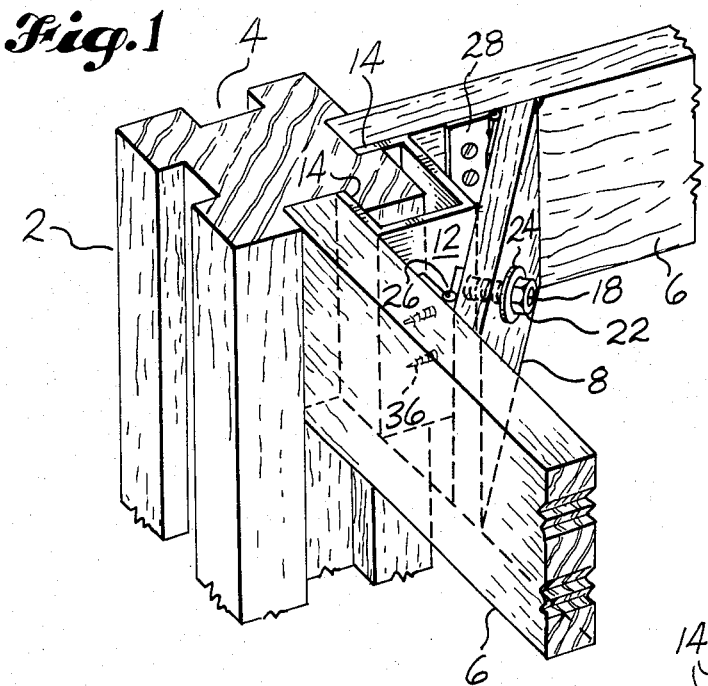
Fig. 1
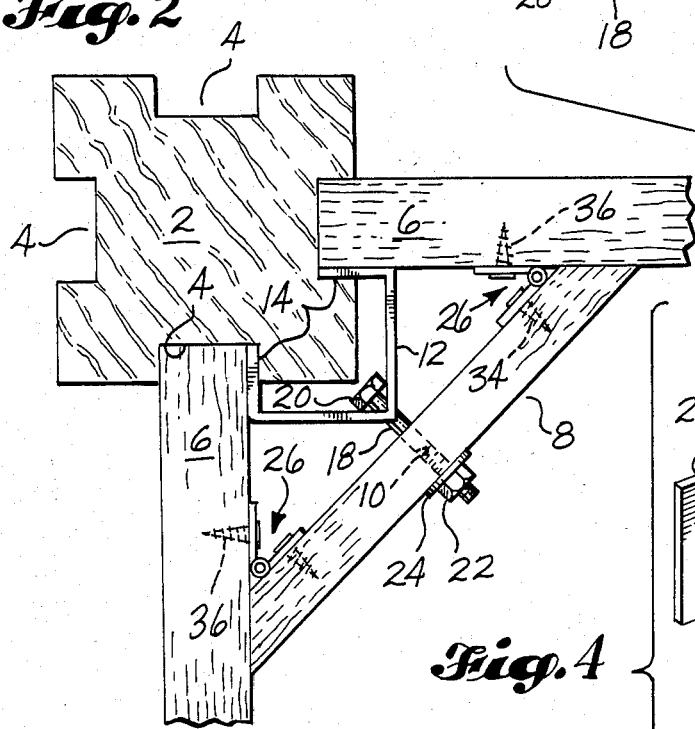
Fig. 2
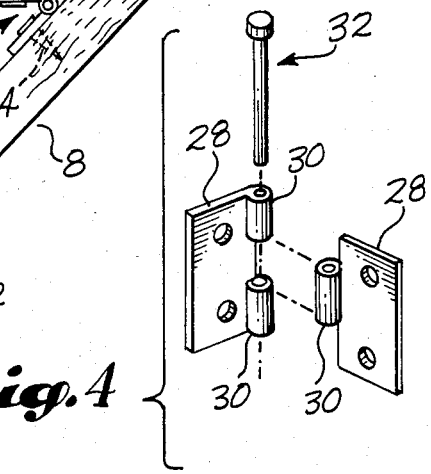
Fig. 3
Fig. 4

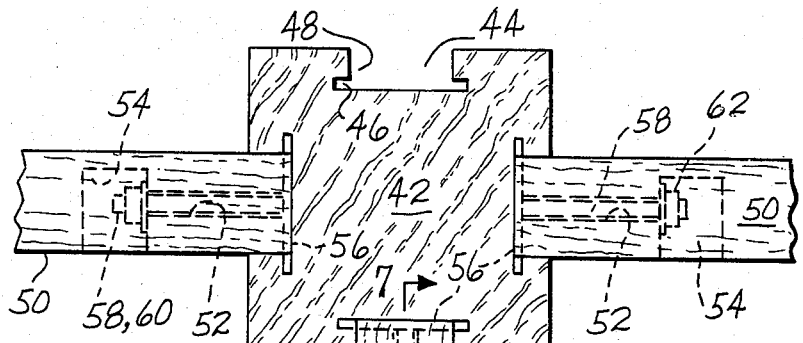
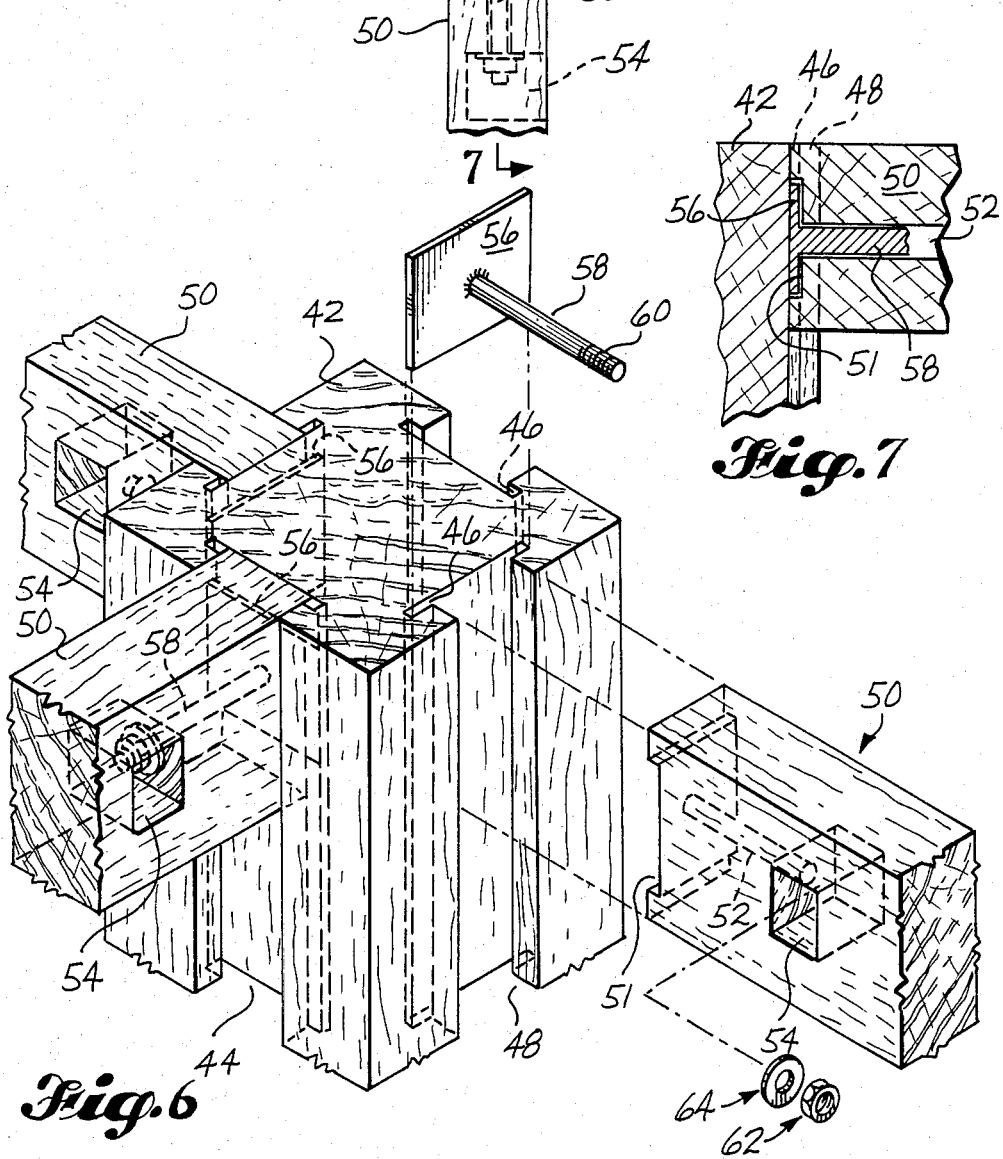

DETACHABLE JOINT FOR MODULAR FURNITURE

DESCRIPTION

1. Technical Field

This invention relates to joints for use in furniture and the like and, more particularly, to such a joint for use in modular structures in which two members are pulled together and releasably secured in place and in which the tightness of the joint is adjustable.

2. Background Art

As our population has become increasingly mobile, there has developed an increasing need for furniture that can easily be moved and that is readily adaptable to a new environment. One way of making furniture more easily movable is to make the furniture collapsible. Known detachable joints for use in collapsible furniture tend to have a number of problems. They tend to be overly complex and expensive and to be specialized for use in particular types of furniture. Such specialization results in a lack of versatility and the need to use a different type of joint for different pieces of furniture and even for different joints in the same piece of furniture. Relatively complex detachable joints are also relatively difficult and time consuming to assemble and disassemble.

Another common problem is that the parts of the joint tend to wear when the joint is assembled and disassembled, thus leading to a loosening of the joint and an overall decrease in the strength of the piece of furniture. This problem is particularly evident in commonly used furniture joints in which the securing of the joint depends upon a screw or screws that are threaded into wood or wood-like parts of the furniture. Such threaded arrangements become stripped very easily when the joint is disassembled and then reassembled. As soon as the threads in the wood begin to become stripped, the reliability of the joint and the usefulness of the furniture are seriously diminished. Known detachable furniture joints are also generally not adjustable so that if the joint should loosen for any reason, there is no means for reliably tightening the joint.

The following U.S. patents each disclose a joint or connection for use in furniture that is described as being separable or is apparently separable:

U.S. Pat. No. 239,838, granted Apr. 5, 1881, to J. Pleukharp;
U.S. Pat. No. 326,582, granted Sept. 22, 1885, to W. A. Osborn et al;
U.S. Pat. No. 430,111, granted June 17, 1890, to A. W. Carl;
U.S. Pat. No. 473,151, granted Apr. 19, 1892, to C. E. Good et al;
U.S. Pat. No. 533,766, granted Feb. 5, 1895, to T. J. Williams:
U.S. Pat. No. 946,423, granted Jan. 11, 1910, to J. W. Connaty;
U.S. Pat. No. 1,945,197, granted Jan. 30, 1934, to C. W. Koch et al;
U.S. Pat. No. 3,166,031, granted Jan. 19, 1965, to O. C. Lauber;
U.S. Pat. No. 3,409,258, granted Nov. 5, 1968, to R. T. Carlson; and
U.S. Pat. No. 3,572,787, granted Mar. 30, 1971, to G. L. Timmerman et al.

Lauber discloses a joint for attaching a leg to an upper horizontal flat member. Two aprons are frictionally fit into grooves on the lower side of the flat member. One end of each apron engages the leg by means of a mortise-tenon attachment.

Pleukharp, Good et al, Connaty, and Carlson each disclose a furniture joint that includes a bracket or brace member that engages a leg or post and two side rails. The brace or clamp fits around a portion of the leg or post and engages side portions of the rails. In the Pleukharp, Good et al, and Carlson devices, the brace or clamp engages grooves in the leg or post and a groove in each of the side rails. The Connaty clamp has portions that fit into grooves on the post and portions that are screwed onto each of the side rails. In the Pleukharp, Connaty, and Carlson joints, the side rails are tenoned to the leg or post. The Connaty furniture clamp fits into the same grooves that receive the tenons of the side rails.

Carl and Koch et al disclose furniture joints in which a metal tie plate extends into slots in a leg or post and into slots in two side rails. The Carl tie plate includes a portion that extends around the leg between the side rails. Each of two flat portions of the tie plate that extend into slots in the leg has the form of a hook on its inner end and is engaged by a dowel. The flat portions that extend into the side rails each have two holes that are also engaged by dowels. The Koch et al tie plate has three flat portions, one of which is received into a slot that extends vertically and diagonally through the leg and the other two of which extend into slots in the side rails. The center portion received by the leg is secured in place by means of a screw, and the portions received in the side rails are secured in place by dowels.

Osborn et al, Williams, and Timmerman et al each disclose a furniture joint that includes a corner member positioned diagonally between two perpendicular rails. In the Williams device, the side rails are received into slots in the leg and are screw connected to the diagonal corner member. A screw member extends through the corner member and has a flattened end that bears against the leg. Timmerman et al provide a table leg with sleeve guide extensions that receive tubular aprons. The diagonal corner member engages slots in these aprons and is held in place by a bolt that extends from the leg through a hole in the diagonal member. The bolt is permanently attached to the leg, such as by welding.

Osborn et al disclose a detachable table leg in which two perpendicular side frame members are tenoned in a first set of mortises in the leg. A bracket extends around a corner of the leg and engages a second set of mortises. A hook member extends from the center of the bracket away from the leg. A diagonal corner member is tenoned to the two side frame members and has a slot that receives the hook member. The hook is secured in place by a rotating member that is carried by the diagonal corner member and that is rotated to engage the hook.

The above patents and the prior art that is cited therein should be studied for the purpose of putting the present invention into proper perspective relative to the prior art.

DISCLOSURE OF THE INVENTION

The subject of this invention is a joint for use in modular structures, such as furniture, grandstands and the like. One aspect of the invention is intended to be used with such structures having a generally horizontal portion. According to this aspect of the invention, the joint comprises a generally vertical support member, a lock member, a rod, and releasable fastening means. The support member has generally vertical slot means dimensioned to receive a part of such horizontal portion of the structure. The lock member has portions receivable into the slot means of the support member and positionable to be contiguous to said part of the horizontal portion when the joint is assembled. The rod extends through the horizontal portion. The rod has a first end that engages the lock member and a second end that projects outwardly from a surface of the horizontal portion. The releasable fastening means engages the second end of the rod to urge the lock member against interior wall portions of the slot means and pull the support member and the horizontal portion together to in turn secure the joint. The fastening means is adjustable for adjusting the tension in the rod and the tightness of the joint.

In a first embodiment of the invention, the horizontal portion comprises first and second side members that are generally perpendicular to each other and the support member, and a diagonal corner brace extending between the side members. The slot means comprises first and second generally vertical slots dimensioned and positioned to receive end portions of the first and second side members, respectively. The lock member extends around the support member between the first and second slots. Said portions of the lock member comprise first and second ends that are receivable into the first and second slots, respectively, and positionable to be contiguous to said end portions of the first and second side members, respectively, when the joint is assembled. The rod engages a center portion of the lock member and extends outwardly from the support member and through a hole in the corner brace. Preferably, the portion of the lock member between its first and second ends is spaced from the support member. Also preferably, the rod comprises a bolt having a head that abuts an inner surface of the lock member, a shaft that extends through a hole in the lock member and said hole in the corner brace, and a threaded end opposite its head. The fastening means comprises a nut that threadedly engages the threaded end of the bolt.

A feature of the invention is attaching means for releasably attaching the corner brace to each of the side members. Preferably, the attaching means comprises hinge means that includes pin means slidable to release the attachment.

In a second embodiment of the invention, the horizontal portion of the structure comprises a generally horizontal member. The slot means comprises a generally vertical slot having a generally T-shaped cross-sectional shape with an inner head portion and an outer narrower stem portion. The stem portion is dimensioned to receive a part of the horizontal member. The lock member comprises a generally flat plate that is wider than the stem portion and dimensioned to be received into the head portion. The rod is attached to and generally perpendicular to a center portion of the plate and extends through a hole in the horizontal member. Preferably, the second end of the rod is threaded, and the fastening means comprises a nut that threadedly engages such second end. Also preferably, the second end of the rod projects into a cavity in the horizontal member that opens onto a surface portion of the horizontal member.

Another aspect of the invention is for use in modular structures, such as furniture, grandstands and the like, having first and second side members that are generally perpendicular to each other. According to this aspect of the invention, the joint comprises a diagonal corner brace extending between the side members, and a generally vertical support member. The support member has first and second generally vertical slots dimensioned and positioned to receive end portions of the first and second side members, respectively. A lock member extends around the support member between the first and second slots. The lock member has first and second ends receivable into the first and second slots, respectively, and positionable to be contiguous to said end portions of the first and second side members, respectively, when the joint is assembled. A rod extends outwardly from the support member and through a hole in the corner brace. The rod has a first end that engages a center portion of the lock member and a second end that projects outwardly from the corner brace. Releasable fastening means is provided for engaging the second end of the rod to urge said ends of the lock member against sidewall portions of the slots and pull the support member and the corner brace together to in turn secure the joint. This fastening means is adjustable for adjusting the tension in the rod and the tightness of the joint.

Still another aspect of the invention is for use in modular structures having a generally horizontal member. According to this aspect of the invention, the joint comprises a generally vertical support member, a lock member, a rod, and releasable fastening means. The support member includes a generally vertical slot having a generally T-shaped cross-sectional shape with an inner head portion and an outer narrower stem portion. The stem portion is dimensioned to receive a part of the horizontal member. The lock member comprises a generally flat plate that is wider than said stem portion and dimensioned to be received into said head portion. The rod is generally perpendicular to the plate and extends through a hole in the horizontal member. The rod has a first end that is attached to a center portion of the plate, and a second end that projects outwardly from a surface of the horizontal member. The releasable fastening means engages the second end of the rod to urge the plate against interior wall portions of said head portion and pull the support member and the horizontal member together to in turn secure the joint. Preferably, the fastening means includes adjusting means for adjusting the tension in the rod and the tightness of the joint.

Joints constructed according to the invention have a number of advantages that avoid the problems encountered with the use of known detachable joints. Joints of the invention are relatively simple in structure and inexpensive to manufacture. Joints of the invention are also relatively easy to assemble and disassemble and very versatile. A joint of the invention may be used in virtually any type of furniture for each of the joints of the furniture. The versatility of joints constructed according to the invention is greatly enhanced by the interchangeability of its parts. For example, substitution of one side member for another may easily be accomplished. This makes various changes possible, such as converting a couch into a chair simply by replacing a side member with a shorter side member. Such versatility makes it possible for furniture to remain useful even after being moved into a much smaller or a much larger interior space. In furniture having joints constructed according to the invention, it is also fairly easy to change the design of the furniture simply by moving the horizontal member or members and the lock member vertically up or down.

Joints constructed according to the invention also have the significant advantage of remaining strong and reliable no matter how many times they are assembled and disassembled. None of the attachments in joints constructed according to the invention that must be detached during disassembly rely on a threaded engagement of wood or a like material and, therefore, the problem of stripped threads is not encountered. In addition, in joints constructed according to the invention in which the releasable fastening means is adjustable, any wear of any of the parts of the joint or the structure that could lead to loosening of the joint may easily be taken up simply by tightening the fastening means.

These and other advantages and features of the invention will become apparent from the detailed description of the best modes for carrying out the invention that follows.

BRIEF DESCRIPTION OF THE DRAWINGS

In the drawings, like element designations refer to like parts throughout, and:

FIG. 1 is a pictorial view of a portion of a modular structure incorporating a first preferred embodiment of the invention.

FIG. 2 is a top plan view of the structure and joint shown in FIG. 1.

FIG. 3 is an exploded pictorial view of the bracket or lock member and bolt and nut arrangement shown in FIGS. 1 and 2.

FIG. 4 is an exploded pictorial view of the hinge structure shown in FIGS. 1 and 2.

FIG. 5 is a top plan view of a portion of a modular structure incorporating a second preferred embodiment of the invention.

FIG. 6 is a partially exploded pictorial view of the structure and joint shown in FIG. 5.

FIG. 7 is a sectional view taken along the line 7—7 in FIG. 5.

BEST MODES FOR CARRYING OUT THE INVENTION

The drawings show two embodiments of a joint for use in modular structures, such as furniture, grandstands and the like, that are constructed in accordance with the invention and that constitute the best modes for carrying out the invention currently known to the applicant. The first preferred embodiment is shown in FIGS. 1-4. The second preferred embodiment is shown in FIGS. 5-7.

FIGS. 1 and 2 show a portion of a modular structure that includes two side members or side rails 6 that are generally perpendicular to each other and to a generally vertical support member 2. In the first preferred embodiment of the joint shown in FIGS. 1-4, the two side rails 6 are secured to the support member 2. The support member 2 has generally vertical slots that are dimensioned and positioned to receive end portions of the side rails 6. In the support member 2 shown in FIGS. 1 and 2, there are four generally vertical slots 4, but of course, a different number of slots could be provided. Only two slots oriented to be generally perpendicular to each other are necessary to secure the two side rails 6. The additional two slots may be provided or not, as desired. The provision of additional slots has the advantage of increasing the versatility of the joint by making it possible to reorient the support member 2 by 90 or 180 degrees or to secure additional side members to the support member 2.

In the joint of the first preferred embodiment, a diagonal corner brace 8 extends between the two side rails 6, as shown in FIGS. 1 and 2. A lock member or bracket 12 and a rod or bolt 18 cooperate to pull the support member 2 and the corner brace 8 together to in turn secure the joint. In the preferred embodiment shown in FIGS. 1-4, the corner brace 8 is releasably attached to each of the side rails 6.

The bracket 12 is most clearly shown in FIG. 3. The bracket 12 is preferably metal and has essentially the shape of a rectangular tube with a square cross section with one corner cut away along the length of the tube. The bracket 12 extends around the support member between the two vertical slots 4 into which the ends of the side rails 6 are received. The two ends 14 of the bracket 12 adjacent to the omitted corner of the rectangular tube are each received into one of the vertical slots 4, as shown in FIGS. 1 and 2. In the assembled joint, the ends 14 of the bracket 12 are positioned to be laterally contiguous to the ends of the side rails 6 that are received into the slots 4. In each of the two slots 4, the end of the side rail 6 and the end 14 of the bracket 12 extend all the way into the slot 4 and abut the inner back surface of the slot 4. Each of the two slots 4 is dimensioned so that its width is just sufficient to snugly receive the end of the side rail 6 and the laterally contiguous end 14 of the bracket 12.

The rod or bolt 18 has a first end that engages a center portion of the bracket 12 between its two ends 14 and a second end that projects outwardly from the surface of the corner brace 8 opposite the support member 2. In the preferred embodiment shown in FIGS. 1-4, the portion of the bracket 12 between its two ends 14 is spaced from the vertical support member 2. This makes assembly and disassembly easier and allows flexibility in the choice of a rod 18. The rod is provided in the form of a bolt 18 that has a head 20 that abuts an inner surface of the bracket 12 which faces the support member 2. The shaft of the bolt 18 extends away from the support member 2 through a hole 16 in said center portion of the bracket 12 and then through a hole 10 in the corner brace 8. The threaded end of the bolt 18 opposite its head 20 projects outwardly from the corner brace 8 opposite the support member 2.

Releasable fastening means engage the second or threaded end of the bolt 18 to urge the ends 14 of the bracket 12 against the adjacent sidewalls of the slots 4 and pull the support member 2 and the corner brace 8 together to in turn secure the joint. In the preferred embodiment shown in FIGS. 1-4, the fastening means comprises a nut 22 and washer 24 which threadedly engage the threaded end of the bolt 18 and which are tightened against the surface of the corner brace 8 from which such threaded end extends. This type of fastening means has the advantages of being very simple but fully adjustable so that the tension in the bolt 18 and the tightness of the joint are fully adjustable.

As noted above, the corner brace 8 is preferably releasably attached to each of the side rails 6. Such attachment enhances the strength and reliability of the joint. In the preferred embodiment shown in FIGS. 1-4, this attachment is accomplished by means of two hinges 26. The preferred construction of the hinges 26 is most clearly shown in FIG. 4. Each of the hinges 26 has two members, each of which includes a flat plate or leaf 28 and one or two knuckles 30. The knuckles 30 fit together in the conventional manner, and the two pieces of the hinge 26 are secured together by means of a hinge pin 32. One of the hinge leafs 28 is attached to the corner brace 8 by means of screws 34, and the other leaf 28 is attached to one of the side rails 6 by means of similar screws 36. In this arrangement, the corner brace 8 may be easily and quickly detached from the rail 6 simply by sliding the hinge pin 32 out of the knuckles 30 to release the attachment.

The second preferred embodiment of the joint of the invention is shown in FIGS. 5-7. In this embodiment, a generally horizontal member or side rail 50 is secured to a generally vertical support member 42. The support member 42 shown in FIGS. 5 and 6 has four vertical slots 44, each of which may receive a side rail 50. In FIGS. 5 and 6, there are actually three joints of the second preferred embodiment shown, with three side rails 50 being secured to the support member 42. It is of course to be understood that the number of vertical slots 44 may be varied and that only one vertical slot 44 is necessary for joining each of the side rails 50 to the support member 42. As with the first preferred embodiment, the provision of extra vertical slots 44 has the advantage of increasing the versatility of the joint. In this case, any number of side rails 50 from one to four may be joined to the support member 42 shown in FIGS. 5 and 6.

In the support member 42 shown in FIGS. 5 and 6, each of the vertical slots 44 is designed to receive the second preferred embodiment of the lock member of the invention. Each slot 44 has a generally T-shaped cross section with an inner head portion 46 and an outer narrower stem portion 48. The stem portion 48 is dimensioned to fairly snugly receive a part of the horizontal member that is to be attached to the support member 42. In the preferred embodiment shown in FIGS. 5-7, one end of the side rail 50 is received into the stem portion 48.

The joint includes a lock member in the form of a generally flat plate 56. This plate 56 is wider than the stem portion 48 of the slot 44 and is dimensioned to be received into the head portion 46 of the slot 44. The joint also includes a rod 58 which is generally perpendicular to the plate 56. A first end of the rod 58 is attached to a center portion of the plate 56. In the preferred embodiment shown in FIGS. 5-7, this first end is attached to the metal plate 56 by welding. The side rail 50 is provided with a longitudinally extending hole 52 through which the rod 58 extends. The second end 60 of the rod 58 projects outwardly from a surface of the side rail 50. Preferably, this surface of the side rail 50 is a sidewall surface of a cavity or window 54 that opens onto a side surface of the side rail 50. The second end 60 of the rod 58 extends into the cavity or window 54.

As in the first embodiment shown in FIGS. 1-4, in the second embodiment releasable fastening means are provided for engaging the second end 60 of the rod 58. This fastening means urges the plate 56 against interior wall portions of the head portion 46 of the slot 44 and pulls the support member 42 and the side rail 50 together to in turn secure the joint. As shown in FIGS. 5-7, the inner end surface of the side rail 50 has a recess 51 formed thereon. The portion of the plate 56 that faces the stem portion 48 of the slot 44 is received into this recess 51. The walls of the recess 51 are contiguous to the face and sides of the plate, preferably with a small amount of clearance to allow for minor variations in the dimensions of the elements of the joint and to ensure that the joint can be tightened sufficiently. In the assembled joint, the two inner end surface portions of the rail 50 adjacent to the recess 51 abut the inner surface of the slot 44.

In the preferred embodiment shown in FIGS. 5 and 6, the second end 60 of the rod 58 is threaded, and the fastening means includes a nut 62 that threadedly engages such second end 60. A washer 64 may be provided. The nut 62 and washer 64 are tightened onto the threaded end 60 of the rod 58 against the sidewall of the cavity 54 from which the threaded end 60 extends. As in the first embodiment, this fastening arrangement has the advantages of being fully adjustable but simple in construction. Of course, the fastening means may be provided in a number of other forms, but preferably the fastening means is adjustable so that the tension in the rod 58 and the tightness of the joint may be fully adjustable.

In a joint constructed according to the invention such as the joints shown in FIGS. 5 and 6, the cavity 54 and the joint itself may be made substantially invisible. This may be done by positioning the cavity to open onto an inner relatively hidden surface of the side rail 50. To further disguise the jont and the cavity, a removable plug (not shown) of wood or other material may be used to fill the opening of the cavity 54.

The assembly and disassembly of either of the two preferred embodiments is quick and easy. In the first embodiment shown in FIGS. 1-4, the parts are first assembled and then attached to support member 2. The rails 6 are attached to the corner brace 8 by means of the hinges 26, the bracket 12 and the bolt 18 are put into position, and the nut 22 is threaded part of the way onto the bolt 18. The ends of the rails 6 and the bracket 12 are then slid into slots 4 and positioned along support member 2. Nut 22 is then tightened to secure the joint. In the second embodiment shown in FIGS. 5-7, the rail 50 is slid onto the rod 58, and the nut 62 is threaded part way onto threaded end 60. Then plate 56 and the end of rail 50 are slid into a slot 44 and positioned along support member 42. Nut 62 is then tightened to secure the joint.

It is anticipated that joints constructed according to the present invention will be used primarily in the construction of modular furniture. Joints constructed according to the invention are particularly useful in modular construction because of their ease of assembly and disassembly and their great versatility. As noted above, it is a simple matter to change one side rail for another to provide a longer or shorter side rail or to slide a side rail along its support member in an upward or downward direction to adjust the size and configuration of the piece of furniture into which the joint is incorporated. In addition, when the support member is provided with extra slots, as are the support members shown in the drawings, it is a simple matter to increase or decrease the number of side rails attached to a given support member. In order to facilitate and maximize the versatility of joints constructed according to the invention, it is preferable to provide four slots on a generally rectangular support member and to form the slots to extend along the entire length of the support member.

Throughout the description of the preferred embodiments of the invention, the terms "horizontal", "vertical" and the like have been used to refer to the orientation of the support member and the structures attached thereto. The use of such terms is for purposes of illustration and is intended to indicate the usual orientation of such elements. It is of course intended to be understood that the use attitude that is illustrated and described herein may be varied without departing from the spirit and scope of the present invention.

It will be obvious to those skilled in the art to which this invention is addressed that the invention may be used to advantage in a variety of situations. Therefore, it is also to be understood by those skilled in the art that various changes, modifications, and omissions in form and detail may be made without departing from the spirit and scope of the present invention as defined by the following claims.

What is claimed is:

1. A joint for use in modular structures, such as furniture, grandstands and the like, having a generally horizontal portion, said joint comprising:
   a generally vertical support member having generally vertical slot means dimensioned to receive a part of said horizontal portion;
   a lock member having portions receivable into the slot means and positionable to be contiguous to said part of said horizontal portion when the joint is assembled;
   a rod which extends through said horizontal portion, and which has a first end that engages the lock member and a second end that projects outwardly from a surface of said horizontal portion; and
   releasable fastening means for engaging the second end of the rod to urge the lock member against interior wall portions of the slot means and pull the support member and said horizontal portion together to in turn secure the joint, said fastening means being adjustable for adjusting the tension in the rod and the tightness of the joint.

2. A joint as described in claim 1, in which said horizontal portion comprises first and second side members that are generally perpendicular to each other and the support member, and a diagonal corner brace extending between the side members; the slot means comprises first and second generally vertical slots dimensioned and positioned to receive end portions of the first and second side members, respectively; the lock member extends around the support member between the first and second slots; said portions of the lock member comprise first and second ends that are receivable into the first and second slots, respectively, and positionable to be contiguous to said end portions of the first and second side members, respectively, when the joint is assembled; and the rod engages a center portion of the lock member and extends outwardly from the support member and through a hole in the corner brace.

3. A joint as described in claim 2, in which the portion of the lock member between its first and second ends is spaced from the support member.

4. A joint as describede in claim 3, in which the rod comprises a bolt having a head that abuts an inner surface of the lock member, a shaft that extends through a hole in the lock member and said hole in the corner brace, and a threaded end opposite its head; and the fastening means comprises a nut that threadedly engages said threaded end.

5. A joint as described in claim 2, further comprising attaching means for releasably attaching the corner brace to each of the side members.

6. A joint as described in claim 5, in which the attaching means comprises hinge means including pin means slidable to release the attachment.

7. A joint as described in claim 1, in which the horizontal portion comprises a generally horizontal member; the slot means comprises a generally vertical slot having a generally T-shaped cross-sectional shape with an inner head portion and an outer narrower stem portion, said stem portion being dimensioned to receive a part of the horizontal member; the lock member comprises a generally flat plate that is wider than said stem portion and dimensioned to be received into said head portion; and the rod is attached to and generally perpendicular to a center portion of the plate and extends through a hole in the horizontal member.

8. A joint as described in claim 7, in which said second end of the rod is threaded, and the fastening means comprises a nut that threadedly engages said second end.

9. A joint as described in claim 7, in which said second end of the rod projects into a cavity in the horizontal member that opens onto a surface portion of the horizontal member.

10. A joint for use in modular structures, such as furniture, grandstands and the like, having first and second side members that are generally perpendicular to each other, said joint comprising:
    a diagonal corner brace extending between the side members;
    a generally vertical support member having first and second generally vertical slots dimensioned and positioned to receive end portions of the first and second side members, respectively;
    a lock member that extends around the support member between the first and second slots, and that has first and second ends receivable into the first and second slots, respectively, and positionable to be contiguous to said end portions of the first and second side members, respectively, when the joint is assembled;
    a rod which has a first end that engages a center portion of the lock member, which extends outwardly from the support member and through a hole in the corner brace, and which has a second end that projects outwardly from the corner brace; and
    releasable fastening means for engaging the second end of the rod to urge said ends of the lock member against sidewall portions of the slots and pull the support member and the corner brace together to in turn secure the joint, said fastening means being adjustable for adjusting the tension in the rod and the tightness of the joint.

11. A joint as described in claim 10, in which the portion of the lock member between its first and second ends is spaced from the support member.

12. A joint as described in claim 11, in which the rod comprises a bolt having a head that abuts an inner surface of the lock member, a shaft that extends through a hole in the lock member and said hole in the corner brace, and a threaded end opposite its head; and the fastening means comprises a nut that threadedly engages said threaded end.

13. A joint as described in claim 10, further comprising attaching means for releasably attaching the corner brace to each of the side members.

14. A joint as described in claim 13, in which the attaching means comprises hinge means including pin means slidable to release the attachment.

15. A joint for use in modular structures, such as furniture, grandstands and the like, having a generally horizontal member, said joint comprising:

a generally vertical support member including a generally vertical slot having a generally T-shaped cross-sectional shape with an inner head portion and an outer narrower stem portion, said stem portion being dimensioned to receive a part of the horizontal member;

a lock member that comprises a generally flat plate that is wider than said stem portion and dimensioned to be received into said head portion;

a rod which is generally perpendicular to the plate; which extends through a hole in the horizontal member; and which has a first end that is attached to a center portion of the plate, and a second end that projects outwardly from a surface of the horizontal member; and releasable fastening means for engaging the second end of the rod to urge the plate against interior wall portions of said head portion and pull the support member and the horizontal member together to in turn secure the joint.

16. A joint as described in claim 15, in which said fastening means includes adjusting means for adjusting the tension in the rod and the tightness of the joint.

17. A joint as described in claim 16, in which said second end of the rod is threaded, and the fastening means comprises a nut that threadably engages said second end.

18. A joint as described in claim 15, in which said second end of the rod projects into a cavity in the horizontal member that opens onto a surface portion of the horizontal member.

* * * * *